(12) United States Patent
Kim et al.

(10) Patent No.: US 7,878,926 B2
(45) Date of Patent: Feb. 1, 2011

(54) GOLF BALLS INCORPORATING PEPTIZERS AND METHOD OF MANUFACTURE

(75) Inventors: Hyun Jin Kim, Carlsbad, CA (US); Hong Guk Jeon, Carlsbad, CA (US); Kelvin Tsugio Okamoto, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 639 days.

(21) Appl. No.: 10/662,619

(22) Filed: Sep. 15, 2003

(65) Prior Publication Data

US 2004/0248669 A1 Dec. 9, 2004

Related U.S. Application Data

(60) Provisional application No. 60/476,985, filed on Jun. 9, 2003.

(51) Int. Cl.
*A63B 37/00* (2006.01)
(52) U.S. Cl. ............................................. 473/351
(58) Field of Classification Search ................ 473/351, 473/377, 373, 374
See application file for complete search history.

(56) References Cited

U.S. PATENT DOCUMENTS

| | | | | |
|---|---|---|---|---|
| 3,560,573 | A * | 2/1971 | Hayden et al. ................ 568/65 |
| 4,482,663 | A | 11/1984 | Kraus | |
| 5,252,652 | A * | 10/1993 | Egashira et al. ............. 524/392 |
| 5,605,968 | A | 2/1997 | Egashira et al. ............. 525/221 |
| 5,756,583 | A | 5/1998 | Egashira et al. ............. 525/196 |
| 5,929,171 | A | 7/1999 | Sano et al. .................. 525/261 |
| 5,948,862 | A | 9/1999 | Sano et al. ..................... 525/89 |
| 5,967,908 | A | 10/1999 | Yamagishi et al. .......... 473/373 |
| 6,106,415 | A | 8/2000 | Masutani et al. ............ 473/374 |
| 6,142,888 | A | 11/2000 | Higuchi et al. .............. 473/377 |
| 6,162,135 | A | 12/2000 | Bulpett et al. ............... 473/373 |
| 6,204,333 | B1 | 3/2001 | Higuchi et al. .............. 525/221 |
| 6,461,252 | B1 | 10/2002 | Yamagishi et al. .......... 473/378 |
| 6,468,168 | B1 * | 10/2002 | Nesbitt et al. ............... 473/357 |
| 6,494,793 | B1 | 12/2002 | Ohama ........................ 473/371 |
| 6,508,968 | B1 | 1/2003 | Bulpett et al. ............... 264/250 |
| 6,525,141 | B2 | 2/2003 | Kataoka ....................... 525/261 |
| 6,561,926 | B2 * | 5/2003 | Hayashi et al. .............. 473/372 |
| 6,695,718 | B2 | 2/2004 | Nesbitt | |
| 2001/0000506 | A1 * | 4/2001 | Sullivan ...................... 473/374 |
| 2001/0031669 | A1 * | 10/2001 | Ohama ........................ 473/371 |
| 2003/0017888 | A1 | 1/2003 | Higuchi et al. .............. 473/371 |
| 2003/0022735 | A1 | 1/2003 | Hayashi et al. .............. 473/377 |
| 2003/0045377 | A1 | 3/2003 | Masutani et al. ............ 473/377 |
| 2003/0064826 | A1 | 4/2003 | Voorheis et al. ............. 473/367 |
| 2003/0073784 | A1 | 4/2003 | Ohama ........................ 525/261 |
| 2004/0230005 | A1 | 11/2004 | Voorheis et al. | |
| 2004/0230006 | A1 * | 11/2004 | Voorheis et al. ............. 525/261 |
| 2005/0245652 | A1 | 11/2005 | Bulpett et al. | |
| 2008/0090678 | A1 | 4/2008 | Kim et al. | |
| 2009/0170634 | A1 | 7/2009 | Loper et al. | |

OTHER PUBLICATIONS

"Encyclopedia of Polymer Science and Technology," vol. 12, 1970, pp. 258-259.
"The Vanderbilt Rubber Handbook," Thirteenth Edition, 1990, pp. 296-330.
"Rubber Technology Handbook," Reprint 1996, pp. 233-236.
Office action dated Jan. 22, 2009 in U.S. Appl. No. 12/217,467.
Rostek, "Novel Sulfur Vulcanization Accelerators Based on Mercapto-Pyridine," *Rubber Chemistry and Technology* 69(2):180-202, 1996.
Non-Final Office action from U.S. Appl. No. 11/639,871 dated Nov. 2, 2009.
Final Office action from U.S. Appl. No. 11/639,871 dated Jun. 9, 2010.
Non-Final Office action from U.S. Appl. No. 12/217,467 dated May 12, 2010.

* cited by examiner

*Primary Examiner*—Raeann Trimiew
(74) *Attorney, Agent, or Firm*—Klarquist Sparkman, LLP

(57) ABSTRACT

A golf ball including a composition having an unsaturated polymer, a cross-linking agent, a peptizer, and an accelerator. The composition can be incorporated into the golf ball's core, intermediate layers, and cover layers, and can provide optimal performance and durability properties. The golf balls incorporating the composition are easy to manufacture.

47 Claims, No Drawings

GOLF BALLS INCORPORATING PEPTIZERS AND METHOD OF MANUFACTURE

CROSS-REFERENCE TO RELATED APPLICATION

Priority is claimed under 35 U.S.C. §119(e) to U.S. Provisional Patent Application No. 60/476,985, filed on Jun. 9, 2003, entitled "Golf Balls Incorporating Peptizers" by Hyun Jim Kim, Hong Guk Jeon, and Kelvin Tsugio Okamoto, which application is incorporated by reference herein.

BACKGROUND OF THE INVENTION

1. Field of the Invention

The present invention relates generally to golf balls incorporating peptizers. In particular, the invention relates to golf balls incorporating peptizers in their cores, intermediate layers, and covers. The present invention also relates to methods for manufacturing these golf balls.

2. Description of Related Art

Golf balls generally include a core and at least one cover layer surrounding the core. Golf balls can be classified as two-piece, multi-layer, or wound balls. Two-piece balls include a spherical inner core and an outer cover layer. Multi-layer balls include a core, a cover layer, and one or more intermediate (or mantle) layers. The intermediate layers can include multiple layers. Wound balls include a core, a rubber thread wound under tension around the core to a desired diameter, and a cover layer, typically of balata material.

Material characteristics of the compositions used in golf ball layers are important in determining the durability and performance of the equipment. For example, the composition of a golf ball cover layer is important in determining the ball's durability, scuff resistance, speed, shear resistance, spin rate, feel, and "click" (the sound made when a golf club head strikes the ball). Various materials having different physical properties are used to make cover layers to create a ball having the most desirable performance possible.

For example, many modern cover layers are made using soft or hard ionomer resins, elastomeric resins, or blends of these. Golf ball cores generally incorporate polybutadiene rubbers, catalyzed by one of a number of known metals. Elastomeric resins used in golf ball covers include a variety of available thermoplastic or thermoset elastomers. Balata, polyurethane (cast, thermoset, and thermoplastic), and ionomers are the three most commonly used materials in this category.

Layers other than cover layers also significantly affect performance of a ball. The composition of an intermediate layer is important in determining the ball's spin rate, speed, and durability. The composition and resulting mechanical properties of the core are important in determining the ball's coefficient of restitution (C.O.R.), i.e., the ratio of the ball's post-impact to pre-impact speed, which affects ball speed and distance when hit, as well as core compression, i.e., a measure of the deflection on the surface of the ball when a standard force is applied. In addition to the performance factors discussed above, processability also is considered when selecting a formulation for a golf ball composition. These same considerations of durability and ease of manufacture are relevant for a wide variety of sports equipment.

Various materials having different physical properties are used to make sports equipment having the most desirable performance possible. One material generally cannot optimize all of the important properties for a particular piece of equipment. For golf balls, properties such as feel, speed, spin rate, resilience, and durability all are important, but improvement of one of these properties by the use of a particular material often can lead to worsening of another property. For example, ideally, a golf ball cover should have good feel and controllability, without sacrificing ball speed, distance, or durability. Despite the broad use of copolymeric ionomers in golf balls, their use alone in, for example, a ball cover can be unsatisfactory. A cover providing good durability, controllability, and feel would be difficult to make using only a copolymeric ionomer resin having a high flexural modulus, because the resulting cover, while having good distance and durability, also will have poor feel and low spin rate, leading to reduced controllability of the ball. Also, the use of particular elastomeric resins alone can lead to compositions having unsatisfactory properties, such as poor durability and low ball speed. With respect to golf ball cores, these cores are formulated to provide the highest possible C.O.R., regardless of their compression, to maximize ball distance when hit. Cores exhibiting low compression provide for improved ball feel, but also tend to exhibit reduced C.O.R.

Golf ball cores generally incorporate polybutadiene rubbers cross-linked with sulfur compounds, or peroxides along with zinc oxide and a metal salt of an acrylate, such as ZDA or ZDMA. These compositions provide for improved properties, however, even with the blending of materials, ideal properties have not been achieved in golf balls. For example, high C.O.R. is preferred because, as mentioned above, it provides for greater ball flight distance. Increasing loading levels of sulfur compounds, peroxides, or acrylate metal salts in the polybutadiene rubber used for a core composition is known to increase C.O.R. However, this also will lead to increased core compression, resulting in poorer ball feel. This relationship between C.O.R. and compression can be adjusted only to a limited extent using known activators, cross-linking agents, and co-cross-linking agents.

A variety of other materials, such as fillers and processing aids, have been used in making golf balls. For example, small amounts of chemical peptizers have been incorporated in golf ball cores. These peptizers generally are used in small amounts to accelerate the softening of polybutadiene rubber under the influence of mechanical force, heat, or a combination of these. Use of these peptizers allows for incorporation of a wider array of active chemical ingredients and fillers in a composition than in their absence. These peptizers also provide for easier processing of these compositions, as well as lower processing temperatures.

In view of the above, it is apparent that improved golf ball cores, intermediate layers, and cover layers that provide optimal performance and durability properties, while demonstrating ease of manufacture, as well as methods for making these cores, intermediate layers, and cover layers, are needed. The present invention fulfills these needs and provides further related advantages.

SUMMARY OF THE INVENTION

An exemplary golf ball that embodies the invention includes a composition having an unsaturated polymer, a cross-linking agent, a peptizer, and an accelerator. The composition can be incorporated into the golf ball's core, intermediate layers, and cover layers, and can provide optimal performance and durability properties. The golf balls incorporating the composition are easy to manufacture.

In other, more detailed features of the invention, the composition includes greater than about 0.1 part, more preferably greater than about 0.5 part, and most preferably greater than about 2.5 parts, by weight of the peptizer per 100 parts by weight of the unsaturated polymer. Also, the peptizer is selected from the group consisting of pentachlorothiophenol, a metal salt of pentachlorothiophenol, a non-metal salt of pentachlorothiophenol, and dibenzamido diphenyldisulfide. In addition, the composition includes from about 0.1 part to about 10 parts, more preferably from about 0.2 part to about 5 parts, and most preferably from about 0.5 part to about 1.5 parts, by weight of the accelerator per 100 parts by weight of the unsaturated polymer. The accelerator is selected from the group consisting of 2-mercaptobenzothiazole and a salt of 2-mercaptobenzothiazole. Furthermore, the composition includes from about 0.05 part to about 5 parts, more preferably from about 0.2 part to about 3 parts, and most preferably from about 0.5 part to 1.5 parts, by weight of the cross-linking agent per 100 parts by weight of the unsaturated polymer.

In other, more detailed features of the invention, the unsaturated polymer is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, block copolymer of styrene and butadiene, block copolymer of styrene and isoprene, nitrile rubber, silicone rubber, polyurethane, and mixtures thereof. Also, the composition further includes an ingredient selected from the group consisting of UV stabilizers, photo stabilizers, antioxidants, colorants, dispersants, mold releasing agents, processing aids, and fillers. In the case where the ingredient is a filler, the filler adjusts a density of the composition. The filler is selected from the group consisting of zinc oxide, tungsten, and barium sulfate. In addition, the composition includes from about 10 parts to about 80 parts by weight of the filler per 100 parts by weight of the unsaturated polymer. Furthermore, the composition includes a compound selected from the group consisting of an unsaturated carboxylic acid, a metal salt of the unsaturated carboxylic acid, and mixtures thereof. The composition includes from about 20 parts to about 60 parts by weight of the compound per 100 parts by weight of the unsaturated polymer.

In other, more detailed features of the invention, the golf ball also includes a core, and a cover layer over the core, wherein at least one of the core and the cover layer includes the composition. The core includes an inner core, and an outer core encasing the inner core. The core includes a material in liquid form. Embodiments of the golf ball also include a layer of rubber thread located between the core and the cover layer. Additional embodiments of the golf ball include a core, at least one intermediate layer over the core, and a cover layer of the outermost intermediate layer. At least one of the core, the at least one intermediate layer, and the cover layer includes the composition.

Another exemplary golf ball that embodies the invention includes a composition including an unsaturated polymer, a cross-linking agent, a peptizer, and an accelerator. The composition includes from about 0.2 part to about 3 parts by weight of the cross-linking agent per 100 parts by weight of the unsaturated polymer, greater than about 0.5 part by weight of the peptizer per 100 parts by weight of the unsaturated polymer, and from about 0.2 part to about 5 parts by weight of the accelerator per 100 parts by weight of the unsaturated polymer.

An exemplary method according to the invention is a method for manufacturing a golf ball. The method includes preparing a composition from an unsaturated polymer, a cross-linking agent, a peptizer, and an accelerator; and forming the composition into the golf ball. In other more detailed features of the invention, the method includes compression molding the composition to induce cross-linking of the unsaturated polymer, and/or applying thermal energy to the composition to induce cross-linking. The composition is formed into half shells, and the method further includes compression molding the half shells.

In other, more detailed features of the invention, the step of preparing the composition includes dry-blending the composition using equipment selected from the group consisting of a tumble mixer, a V-blender, a ribbon blender, and a two-roll mill. Also, the step of preparing the composition includes mixing the composition using equipment selected from the group consisting of a mill, an internal mixer, an extruder, and combinations thereof.

Other features and advantages of the present invention should become apparent from the following detailed description of the preferred embodiments.

DETAILED DESCRIPTION OF THE PREFERRED EMBODIMENTS

The present invention is embodied in golf balls incorporating a composition that includes an unsaturated polymer, a peptizer, a cross-linking agent, and an accelerator. The combination of the unsaturated polymer, peptizer and accelerator provide for increased coefficient of restitution (C.O.R.) for, and compression for, a golf ball. The unsaturated polymer and peptizer can be present in golf ball covers, intermediate layers, and/or cores. The present invention also resides in methods of manufacture of sports equipment, such as golf balls, incorporating these compositions. These golf balls are easy to prepare, and they can tailored to meet a wide range of specifications and preferred performance.

The present invention includes golf ball cores, intermediate layers, and cover layers (collectively, the ball layers) incorporating a composition comprising an unsaturated polymer, a cross-linking agent, a peptizer, and an accelerator having greater than about 0.1 part by weight of the peptizer per 100 parts by weight of the unsaturated polymer, and from about 0.1 part to about 10 parts by weight of the accelerator per 100 parts by weight of the unsaturated polymer. More preferably, the ball composition incorporates greater than about 0.5 part, and most preferably greater than about 2.5 parts, by weight of the peptizer per 100 parts by weight of the unsaturated polymer. More preferably, the ball composition incorporates about 0.2 part to about 5 parts, and most preferably about 0.5 part to about 1.5 parts, by weight of the accelerator per 100 parts by weight of the unsaturated polymer.

Peptizers can be defined as chemicals that inhibit cross-linking during the processing of unsaturated polymers. The peptizer can further participate in the cross-linking of the unsaturated polymer when cross-linking does begin. The peptizer comprises an organic sulfur compound and/or its metal or non-metal salt. Examples of the organic sulfur compound include: thiophenols, such as pentachlorothiophenol and its metal and non-metal salts, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Examples of the metal salts of an organic sulfur compound include zinc salts of the above-mentioned thiophenols and thiocarboxylic acids. Examples of non-metal salts of an organic sulfur compound include the amine or ammonium salts of the above-mentioned thiophenols and thiocarboxylic acids. Preferred peptizers include pentachlorothiophenol, its metal salts, and its non-metal salts, and dibenzamido diphenyldisulfide. Peptizers can be used alone or in an admixture of two or more peptizers.

Accelerators added to the unsaturated polymer increase the vulcanization rate and/or decrease the vulcanization temperature of the unsaturated polymers. Accelerators can be of any class known for rubber processing including mercapto-, sulfenamide-, thiuram, dithiocarbamate, dithiocarbamylsulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler M Z, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts. The golf ball composition can comprise one or more accelerators of one or more classes.

Unsaturated polymers suitable for use in the golf balls of the present invention include any polymeric material having an unsaturation, either hydrocarbon or non-hydrocarbon, capable of participating in a cross-linking reaction initiated thermally, chemically, by irradiation, or by a combination of these methods. Non-limiting examples of suitable unsaturated polymers include 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer, styrene-isoprene-styrene block copolymer, nitrile rubber, silicone rubber, and polyurethane, as well as mixtures of these.

The base rubber used herein can be any rubber commonly used in conventional one-piece golf balls and cores of multi-layered golf balls. Polybutadiene rubbers, especially poly(1,4-butadiene) rubbers containing at least 40 mol %, and more preferably 80 to 100 mol % of cis-1,4 bonds, are preferred because of their high rebound resilience, extrusion moldability, and high strength after vulcanization. The poly(1,4-butadiene) rubbers can be blended with natural rubber, polyisoprene rubber, styrene-butadiene rubber, or the like. At least 80% by weight of poly(1,4-butadiene) rubber should be present in the base rubber, because base rubbers containing less poly(1,4-butadiene) rubber often fail to take advantage of the rebound resilience of the polybutadiene rubber.

Many different types of 1,2-polybutadienes exist, having widely varying physical properties as a result of their differing tacticity, crystallinity, and molecular weight. Examples of 1,2-polybutadienes having differing tacticity, all of which are suitable as unsaturated polymers for use in the present invention, are atactic 1,2-polybutadiene, isotactic 1,2-polybutadiene, and syndiotactic 1,2-polybutadiene. Syndiotactic polymers include alternating base units that are enantiomers of each other. These 1,2-polybutadienes are also differentiated by their crystallinity, which ranges from amorphous 1,2-polybutadienes that essentially lack crystallinity to semi-crystalline 1,2-polybutadienes that have different crystallinities in their structures. The molecular weights of these 1,2-polybutadienes vary greatly. These various combinations of tacticity, crystallinity, and molecular weight provide for many different types of 1,2-polybutadienes having very different processability, as well as other chemical, thermal, mechanical, and rheological properties.

Syndiotactic 1,2-polybutadiene having a crystallinity suitable for use as an unsaturated polymer in compositions within the scope of the present invention are polymerized from a 1,2-addition of butadiene. Golf balls within the scope of the present invention include syndiotactic 1,2-polybutadiene having crystallinity and greater than about 70% of 1,2-bonds, more preferably greater than about 80% of 1,2-bonds, and most preferably greater than about 90% of 1,2-bonds. Also, golf balls within the scope of the present invention include syndiotactic 1,2-polybutadiene having crystallinity between about 5% and about 50%, more preferably between about 10% and about 40%, and most preferably between about 15% and about 30%. In addition, golf balls within the scope of the present invention include syndiotactic 1,2-polybutadiene having crystallinity and a mean molecular weight between about 10,000 and about 350,000, more preferably between about 50,000 and about 300,000, more preferably between about 80,000 and about 200,000, and most preferably between about 10,000 and about 150,000. An example of a suitable syndiotactic 1,2-polybutadiene having crystallinity for use in golf balls within the scope of the present invention is sold under the trade name RB810, RB820, and RB830 by JSR Corporation of Tokyo, Japan. These have more than 90% of 1,2 bonds, a mean molecular weight of approximately 120,000, and a crystallinity between about 15% and about 30%.

The metal salt of unsaturated carboxylic acid is blended with the rubber as a co-cross-linking agent. Examples of these include zinc and magnesium salts of unsaturated fatty acids having 3 to 8 carbon atoms, such as acrylic acid, methacrylic acid, maleic acid, and fumaric acid, with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 20 parts to about 60 parts by weight of the unsaturated carboxylic acid per 100 parts by weight of the unsaturated polymer.

Suitable cross-linking agents for use in the golf balls of the present invention include any sulfur compounds, peroxides, or other known chemical cross-linking agents, as well as mixtures of these. Non-limiting examples of suitable cross-linking agents include primary, secondary, or tertiary aliphatic or aromatic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene, t-butylperoxybenzoate; 2,5-dimethyl-2, 5-di-(t-butylperoxy)hexyne-3; 1,1-bis(t-butylperoxy)-3,3,5 tri-methylcyclohexane, such as Varox 231-XL, marketed by R.T. Vanderbilt Co., Inc. of Norwalk, Conn.; and di-(2,4- dichlorobenzoyl)peroxide. The cross-linking agent can be blended in amounts of about 0.05 part to about 5 parts, more preferably about 0.2 part to about 3 parts, and most preferably about 0.5 part to about 1.5 parts, by weight of the cross-linking agent per 100 parts by weight of the unsaturated polymer.

Besides the use of chemical cross-linking agents, exposure of the composition to radiation also can serve as a cross-linking agent. Radiation can be applied to the unsaturated polymer and peptizer mixture by any known method, including using microwave or gamma radiation, or an electron beam device.

The composition also can incorporate a filler. Preferred examples of fillers include metal oxides, such as zinc oxide and magnesium oxide. The filler can be blended in amounts of about 10 parts to about 80 parts by weight per 100 parts by weight of the base rubber. If desired, the rubber composition can additionally contain a plasticizer, an antioxidant, and any other additives generally employed in the preparation of one-piece balls or the cores of multi-layered balls. The appropriate amounts for these materials can be readily determined without undue experimentation.

Golf balls within the scope of the present invention can be prepared by molding the rubber composition as formulated above into a sphere of desired size—that is, a ball in the case of a one-piece ball, or into a core in the case of a multi-layered ball—and vulcanizing the rubber by heating. The manufacture of these spheres can be in accord with conventional methods and conditions of manufacture.

In addition to the materials discussed above, compositions within the scope of the present invention can incorporate one or more polymers. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Suitable polyamides for use as an additional material in the compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other preferred materials suitable for use as an additional material in compositions within the scope of the present invention include polyester elastomers marketed under the tradename SKYPEL by SK Chemicals of South Korea, or diblock or triblock copolymers marketed under the tradename SEPTON by Kuraray Corporation of Kurashiki, Japan, and KRATON by Kraton Polymers Group of Companies of Chester, United Kingdom. All of the materials listed above can provide for particular enhancements to ball layers prepared within the scope of the present invention.

Ionomers also are well suited for blending into compositions within the scope of the present invention. Suitable ionomeric polymers (i.e., copolymer- or terpolymer-type ionomers) include α-olefin/unsaturated carboxylic acid copolymer-type ionomeric or terpolymer-type ionomeric resins. Copolymeric ionomers are obtained by neutralizing at least a portion of the carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least a portion of the carboxylic groups in a terpolymer of an α-olefin, and an α,β-unsaturated carboxylic acid having 3 to 8 carbon atoms and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Terpolymeric ionomers include ionomers having varied acid contents and degrees of acid neutralization, neutralized by monovalent or bivalent cations as discussed above. Examples of suitable ionomeric resins include those marketed under the name SURLYN manufactured by E.I. du Pont de Nemours & Company of Wilmington, Del., and IOTEK manufactured by Exxon Mobil Corporation of Irving, Tex.

Silicone materials also are well suited for blending into compositions within the scope of the present invention. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethyl siloxane-methylhexenylsiloxane copolymers; trimethylsiloxy-endblocked dimethylsiloxane-methylvinylsiloxane copolymers; trimethylsiloxy-endblocked methylphenylsiloxane-dimethyl siloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd. of Osaka, Japan.

Golf balls within the scope of the present invention also can include, in suitable amounts, one or more additional ingredients generally employed in golf ball compositions. Agents provided to achieve specific functions, such as additives and stabilizers, can be present. Suitable ingredients include colorants, UV stabilizers, photo stabilizers, antioxidants, colorants, dispersants, mold releasing agents, processing aids, and fillers. The compositions can incorporate, for example, inorganic fillers, such as titanium dioxide, calcium carbonate, zinc sulfide, or zinc oxide. Additional fillers can be chosen to impart additional density to the compositions, such as zinc oxide, barium sulfate, tungsten, or any other metallic powder having a density higher than that of the base polymeric resin. Any organic or inorganic fibers, either continuous or non-continuous, also can be in the composition. An example of these is silica-containing filler, which preferably is selected from finely divided, heat-stable minerals, such as fumed and precipitated forms of silica, silica aerogels, and titanium dioxide having a specific surface area of at least about 10 $m^2$/gram.

The unsaturated polymer, peptizer, accelerator, and other additives including cross-linking agent if appropriate can be mixed together to form the golf balls of the present invention, with or without melting them. Dry blending equipment, such as a tumble mixer, V-blender, ribbon blender, or two-roll mill, can be used to mix the compositions. The unsaturated polymer, peptizer, and accelerator can be mixed together with a cross-linking agent, or each additive can be added in an appropriate sequence to the milled unsaturated polymer, e.g., peptizer then accelerator then cross-linking agent. The golf ball compositions can be mixed using a mill, internal mixer, extruder or combinations of these, with or without application of thermal energy to produce melting. In another method of manufacture of these compositions, the peptizer and/or the cross-linking agent can be added to the unsaturated polymer as part of a concentrate using dry blending, roll milling, or melt mixing. If radiation is the cross-linking agent, then the mixture comprising the unsaturated polymer and peptizer can be irradiated following mixing, during forming into a part such as the core of a ball, or after forming.

A preferred method for making golf balls within the scope of the present invention involves injection molding a core, intermediate layer, or cover of the composition into a cold mold without inducing heavy cross-linking of the unsaturated polymer. The product from this process then is compression molded to induce partial or full cross-linking of the unsaturated polymer by use of thermal energy. In another preferred method, injection molding is used to inject the composition around a core positioned in a mold, in which thermal energy is applied to induce cross-linking. In yet another preferred method, an intermediate layer or a cover of the unsaturated polymer, peptizer, and cross-linking agent can be prepared by injection molding the mixture as half shells. The half shells are then positioned around a core and compression molded. The heat and pressure first melt the composition to seal the two half shells together forming a complete layer. Additional thermal energy induces cross-linking of the unsaturated polymer. In another preferred method, half shells of the unsaturated polymer and peptizer are prepared. The half shells are coated with the cross-linking agent and compression molded around a core to form a layer and to induce cross-linking. In another preferred method, a layer incorporating the unsaturated polymer and peptizer is positioned around a core to form a layer. The layer then is coated with the cross-linking agent and compression molded to induce cross-linking. When used to form a cover layer, a preferred embodiment of the method involves preparing the cover layer using injection molding and forming dimples on the surface of the cover layer, while inducing full or partial cross-linking of the layer during injection molding. Alternately, the cover layer can be formed using injection molding without dimples, after which the cover layer is compression molded to form dimples and also to induce full or partial cross-linking.

EXAMPLES

A series of ball cores having diameters of 1.58 in. and suitable for use in golf balls within the scope of the present invention were prepared and tested for C.O.R. and compression. The cores each incorporated 400 g of predominantly cis-1,4-polybutadiene rubber, and 4 g of Varox 231XL cross-linking agent. Additionally, the cores incorporated 69 g of zinc oxide and 140 g of zinc diacrylate. Finally, some cores incorporated selected amounts of a peptizer, either dibenzamido diphenyldisulfide (DBDD) or pentachlorothiophenol (PCTP), and/or Nocceler M60 accelerator. Detailed composition information for the cores is provided in Table 1 below.

TABLE 1

| Core. # | CB10 (pph*) | ZnO (pph) | ZDA (pph) | Varox 231XL** (pph) | PCTP (pph) | DBDD (pph) | Nocceler MC60 (pph) |
|---|---|---|---|---|---|---|---|
| 1 | 100 | 17.25 | 35 | 1 | 1 | — | — |
| 2 | 100 | 17.25 | 35 | 1 | — | — | 2 |
| 3 | 100 | 17.25 | 35 | 1 | 1 | — | 1 |
| 4 | 100 | 17.25 | 35 | 1 | 1 | — | 2 |
| 5 | 100 | 17.25 | 35 | 1 | — | 1 | — |
| 6 | 100 | 17.25 | 35 | 1 | — | 1 | 0.5 |
| 7 | 100 | 17.25 | 35 | 1 | — | 1 | 1 |

*pph = parts per hundred of unsaturated polymer
**active peroxide = 40%; e.g. 1 pph Varox 231XL = 0.40 pph active peroxoide As stated above, each of the compositions were tested for C.O.R. and compression. Results of this testing are provided in Table 2 below.

TABLE 2

| Core # | C.O.R. | Compression |
|---|---|---|
| 1 | 0.786 | Too Low |
| 2 | 0.809 | 78 |
| 3 | 0.796 | 39 |
| 4 | 0.806 | 54 |
| 5 | 0.782 | 41 |
| 6 | 0.797 | 52 |
| 7 | 0.791 | 46 |

The optimal results call for the C.O.R. value to be as high as possible with the Atti compression value ranging from 40 to 80. The results of the testing indicate that the addition of accelerator to the peptized composition increases the C.O.R. value and allows for adjustment of the compression value within the desired range. For example, cores 3 and 4 incorporating Nocceler M60 had core compression values of 39 and 54, respectively, a dramatic increase of compression value from the reference compression value in core 1, which was too low to measure. In contrast, the C.O.R. values of cores 3 and 4 were 0.796 and 0.806, respectively, in comparison to the C.O.R. value for core 1 of 0.786. Similar results can be seen by comparing the C.O.R. and compression values for cores 6 and 7 to the corresponding values for core 5. A comparison of the C.O.R. and compression values for cores 2 and 4, results in the observation that the C.O.R. value was not significantly affected by the addition of PCTP while the compression value decreased from 78 to 54.

The data shows that an improvement in feel (via an adjustment of the compression value) can be attained while improving distance (maintaining the C.O.R. value). This allows for tremendous flexibility in preparation of golf balls, because core compositions that previously provided excellent C.O.R. values with unacceptably high compression values can now be formulated to include peptizers, which results in compositions having acceptable compression values in addition to acceptable C.O.R. values. Furthermore, core compositions that previously provided acceptable C.O.R. values but low compression values can now be formulated to include an accelerator, so that the resulting compositions have acceptable compression values in addition to acceptable C.O.R. values.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

We claim:

1. A golf ball including a composition comprising:
   an unsaturated polymer;
   a cross-linking agent comprising a peroxide;
   a peptizer selected from the group consisting of an amine salt of pentachlorothiophenol, an ammonium salt of pentachlorothiophenol, and mixtures thereof; and
   an accelerator.

2. The golf ball according to claim 1, wherein the composition includes greater than about 0.1 part by weight of the peptizer per 100 parts by weight of the unsaturated polymer.

3. The golf ball according to claim 1, wherein the composition includes greater than about 0.5 part by weight of the peptizer per 100 parts by weight of the unsaturated polymer.

4. The golf ball according to claim 1, wherein the composition includes greater than about 2.5 parts by weight of the peptizer per 100 parts by weight of the unsaturated polymer.

5. The golf ball according to claim 1, wherein the composition includes from about 0.1 part to about 10 parts by weight of the accelerator per 100 parts by weight of the unsaturated polymer.

6. The golf ball according to claim 1, wherein the composition includes from about 0.2 part to about 5 parts by weight of the accelerator per 100 parts by weight of the unsaturated polymer.

7. The golf ball according to claim 1, wherein the composition includes from about 0.5 part to about 1.5 parts by weight of the accelerator per 100 parts by weight of the unsaturated polymer.

8. The golf ball according to claim 1, wherein the accelerator is selected from the group consisting of 2-mercaptobenzothiazole and a salt of 2-mercaptobenzothiazole.

9. The golf ball according to claim 1, wherein the composition includes from about 0.05 part to about 5 parts by weight of the cross-linking agent per 100 parts by weight of the unsaturated polymer.

10. The golf ball according to claim 1, wherein the composition includes from about 0.2 part to about 3 parts by weight of the cross-linking agent per 100 parts by weight of the unsaturated polymer.

11. The golf ball according to claim 1, wherein the composition includes from about 0.5 part to about 1.5 parts by weight of the cross-linking agent per 100 parts by weight of the unsaturated polymer.

12. The golf ball according to claim 1, wherein the unsaturated polymer is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, block copolymer of styrene and butadiene, block copolymer of styrene and isoprene, nitrile rubber, silicone rubber, polyurethane, and mixtures thereof.

13. The golf ball according to claim 1, wherein the composition further comprises one or more ingredients selected from the group consisting of UV stabilizers, photo stabilizers, antioxidants, colorants, dispersants, mold releasing agents, processing aids, and fillers.

14. The golf ball according to claim 13, wherein one or more ingredients include a filler that adjusts a density of the composition.

15. The golf ball according to claim 13, wherein the one or more ingredients include a filler selected from the group consisting of zinc oxide, tungsten, and barium sulfate.

16. The golf ball according to claim 13, wherein the one or more ingredients include a filler and the composition includes from about 10 parts to about 80 parts by weight of the filler per 100 parts by weight of the unsaturated polymer.

17. The golf ball according to claim 1, wherein the composition further comprises a compound selected from the group consisting of an unsaturated carboxylic acid, a metal salt of the unsaturated carboxylic acid, and mixtures thereof.

18. The golf ball according to claim 17, wherein the composition includes from about 20 parts to about 60 parts by weight of the compound per 100 parts by weight of the unsaturated polymer.

19. The golf ball according to claim 1, further comprising:
   a core; and
   a cover layer over the core;
   wherein at least one of the core and the cover layer includes the composition.

20. The golf ball according to claim 19, wherein the core includes:
an inner core; and
an outer core encasing the inner core.

21. The golf ball according to claim 19, wherein the core includes a material in liquid form.

22. The golf ball according to claim 19, further comprising a layer of rubber thread located between the core and the cover layer.

23. The golf ball according to claim 1, further comprising:
a core;
at least one intermediate layer over the core; and
a cover layer over the outermost intermediate layer;
wherein at least one of the core, the at least one intermediate layer, and the cover layer includes the composition.

24. The golf ball according to claim 1, and further comprising a co-cross-linking agent that is a metal salt of an unsaturated carboxylic acid.

25. The golf ball according to claim 1, wherein the cross-linking agent is selected from the group consisting of diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl-)benzene, t-butylperoxybenzoate; 2,5-dimethyl-2,5-di-(t-butylperoxy)hexyne-3; 1,1-bis(t-butylperoxy)-3,3,5 tri-methylcyclohexane; and di-((2,4-dichlorobenzoyl)peroxide.

26. The golf ball according to claim 25, wherein the cross-linking co-cross-linking agent is 2,5-dimentyl-2,5-di-(t-butylperoxy)hexyne-3.

27. The golf ball according to claim 25, wherein the cross-linking agent includes 1,1-bis(t-butylperoxy)-3,3,5 tri-methylcyclohexane.

28. A golf ball including a composition comprising:
an unsaturated polymer;
a cross-linking agent comprising a peroxide;
a peptizer selected from the group consisting of an amine salt of pentachlorothiophenol, an ammonium salt of pentachlorothiophenol, and mixtures thereof; and
an accelerator;
wherein the composition includes:
from about 0.2 part to about 3 parts by weight of the cross-linking agent per 100 parts by weight of the unsaturated polymer,
greater than about 0.5 part by weight of the peptizer per 100 parts 10 by weight of the unsaturated polymer, and
from about 0.2 part to about 5 parts by weight of the accelerator per 100 parts by weight of the unsaturated polymer.

29. The golf ball according to claim 28, wherein the composition includes greater than about 2.5 parts by weight of the peptizer per 100 parts by weight of the unsaturated polymer.

30. The golf ball according to claim 28, wherein the accelerator is selected from the group consisting of 2-mercaptobenzothiazole and a salt of 2-mercaptobenzothiazole.

31. The golf ball according to claim 28, wherein the unsaturated polymer is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, block copolymer of styrene and butadiene, block copolymer of styrene and isoprene, nitrile rubber, silicone rubber, polyurethane, and mixtures thereof.

32. The golf ball according to claim 28, wherein the composition further comprises one or more ingredients selected from the group consisting of UV stabilizers, photo stabilizers, antioxidants, colorants, dispersants, mold releasing agents, processing aids, and fillers.

33. The golf ball according to claim 32, wherein the one or more ingredients include a filler that adjusts a density of the composition.

34. The golf ball according to claim 32, wherein the one or more ingredients include a filler selected from the group consisting of zinc oxide, tungsten, and barium sulfate.

35. The golf ball according to claim 32, wherein the one or more ingredients include a filler and the composition includes from about 10 parts to about 80 parts by weight of the filler per 100 parts by weight of the unsaturated polymer.

36. The golf ball according to claim 28, wherein composition further comprises a compound selected from the group consisting of an unsaturated carboxylic acid, a metal salt of the unsaturated carboxylic acid, and mixtures thereof.

37. The golf ball according to claim 36, wherein the composition includes from about 20 parts to about 60 parts by weight of the compound per 100 parts by weight of the unsaturated polymer.

38. The golf ball according to claim 28, further comprising:
a core; and
a cover layer over the core;
wherein at least one of the core or cover layer includes the composition.

39. The golf ball according to claim 38, wherein the core includes:
an inner core; and
an outer core encasing the inner core.

40. The golf ball according to claim 38, wherein the core includes a material in liquid form.

41. The golf ball according to claim 38, further comprising a layer of rubber thread located between the core and the cover layer.

42. The golf ball according to claim 28, further comprising:
a core;
at least one intermediate layer over the core; and
a cover layer over the outermost intermediate layer;
wherein at least one of the core, the at least one intermediate layer, and the cover layer includes the composition.

43. The golf ball according to claim 28, and further comprising a co-cross-linking agent that is a metal salt of an unsaturated carboxylic acid.

44. The golf ball according to claim 28, wherein the cross-linking agent is selected from the group consisting of diacetyl peroxide, di-tert-butyl peroxide; dibenzoyl peroxide, dicumyl peroxide; 2,5-dimethyl-2,5-di(benzoylperoxy)hexane; 1,4-bis-(t-butylperoxyisopropyl-)benzene; t-butylperoxybenzoate; 2,5-dimethyl-2,5-di-(t-butylperoxy)hexyne-3; 1,1-bis(t-butylperoxy)-3,3,5 tri-methylcyclohexane; and di-(2,4-dichlorobenzoyl)peroxide.

45. The golf ball according to claim 44, wherein the cross-linking agent includes 2,5-dimethyl-2,5-di-(t-butylperoxy)hexyne-3.

46. The golf ball according to claim 44, wherein the cross-linking agent includes 1,1-bis(t-butylperoxy)-3,3,5 tri-methylcyclohexane.

47. A method for manufacturing a golf ball, the method comprising:
providing:
an unsaturated polymer,
a cross-linking agent comprising a peroxide,
a peptizer selected from the group consisting of an amine salt of pentachlorothiophenol, an ammonium salt of pentachlorothiophenol, and mixtures thereof, and
an accelerator;
preparing a composition from the unsaturated polymer, the cross-linking agent, the peptizer, and the accelerator; and
forming the composition into the golf ball.

* * * * *